United States Patent
Wang (10) Patent No.: US 9,166,946 B2
(45) Date of Patent: Oct. 20, 2015

(54) METHOD, APPARATUS AND SYSTEM FOR AP TO MANAGE WIRELESS REPEATER

(71) Applicant: Huawei Device Co., Ltd., Shenzhen (CN)

(72) Inventor: Weihong Wang, Shenzhen (CN)

(73) Assignee: Huawei Device Co., Ltd., Shenzhen (CN)

( * ) Notice: Subject to any disclaimer, the term of this patent is extended or adjusted under 35 U.S.C. 154(b) by 447 days.

(21) Appl. No.: 13/715,394

(22) Filed: Dec. 14, 2012

(65) Prior Publication Data
US 2013/0103855 A1   Apr. 25, 2013

Related U.S. Application Data

(63) Continuation of application No. PCT/CN2011/083937, filed on Dec. 14, 2011.

(51) Int. Cl.
*G06F 15/16* (2006.01)
*H04L 29/12* (2006.01)
(Continued)

(52) U.S. Cl.
CPC ............ *H04L 61/2015* (2013.01); *H04L 41/04* (2013.01); *H04L 41/0809* (2013.01); *H04W 24/00* (2013.01); *H04W 24/08* (2013.01); *H04W 84/047* (2013.01)

(58) Field of Classification Search
CPC .................................................. H04L 61/1511
USPC .......................................................... 709/245
See application file for complete search history.

(56) References Cited

U.S. PATENT DOCUMENTS 6,185,598 B1 *  2/2001  Farber et al. ................... 709/200
6,584,080 B1 *  6/2003  Ganz et al. ..................... 370/315
(Continued)

FOREIGN PATENT DOCUMENTS

CN          1819552 A      8/2006
CN        101645875 A      2/2010
(Continued)

OTHER PUBLICATIONS

Communication from a foreign counterpart application, International Application No. PCT/CN2011/083937, International Search Report dated Mar. 22, 2012, 3 pages.
(Continued)

*Primary Examiner* — Hamza Algibhah
(74) *Attorney, Agent, or Firm* — Conley Rose, P.C.; Grant Rodolph; Nicholas K. Beaulieu (57) ABSTRACT

Embodiments of the present invention relate to the field of communications technologies, disclose a method, an apparatus and a system for an access point (AP) to manage a wireless repeater, and include: receiving an internet protocol (IP) address request message that includes a domain name of a repeater to be managed and that is sent by a management console; parsing the IP address request message to obtain the domain name of the repeater to be managed; obtaining, from a domain name management list, an IP address of the repeater that corresponds to the domain name of the repeater to be managed, where correspondence between an IP address of a repeater and domain name information of the repeater is recorded in the domain name management list; and sending, to the management console, the IP address of the repeater that corresponds to the domain name of the repeater to be managed.

12 Claims, 5 Drawing Sheets

(51) Int. Cl.
*H04L 12/24* (2006.01)
*H04W 24/08* (2009.01)
*H04W 24/00* (2009.01)
*H04W 84/04* (2009.01)

(56) References Cited

U.S. PATENT DOCUMENTS

| | | | |
|---|---|---|---|
| 6,754,212 B1* | 6/2004 | Terada et al. | 370/389 |
| 8,131,209 B1* | 3/2012 | Chen et al. | 455/11.1 |
| 2004/0081173 A1* | 4/2004 | Feather | 370/395.54 |
| 2006/0040615 A1* | 2/2006 | Mohamadi | 455/25 |
| 2006/0205342 A1* | 9/2006 | McKay et al. | 455/11.1 |
| 2006/0205343 A1* | 9/2006 | Runyon et al. | 455/11.1 |
| 2006/0209855 A1 | 9/2006 | Uchida et al. | |
| 2006/0251034 A1* | 11/2006 | Park | 370/338 |
| 2006/0280138 A1* | 12/2006 | Nanda et al. | 370/315 |
| 2007/0150732 A1* | 6/2007 | Suzuki et al. | 713/168 |
| 2007/0211714 A1* | 9/2007 | Metke et al. | 370/389 |
| 2008/0013473 A1* | 1/2008 | Proctor et al. | 370/315 |
| 2008/0082642 A1* | 4/2008 | Wu | 709/222 |
| 2009/0252063 A1* | 10/2009 | Owen et al. | 370/255 |
| 2010/0121954 A1* | 5/2010 | Yang et al. | 709/225 |
| 2010/0329173 A1* | 12/2010 | Murphy et al. | 370/313 |
| 2011/0019607 A1* | 1/2011 | Beck et al. | 370/315 |
| 2011/0274029 A1* | 11/2011 | Connelly et al. | 370/315 |
| 2012/0023153 A1* | 1/2012 | Karasaridis | 709/203 |
| 2012/0096106 A1* | 4/2012 | Blumofe et al. | 709/213 |
| 2012/0155371 A1* | 6/2012 | Wang | 370/315 |
| 2012/0178416 A1* | 7/2012 | Miklos et al. | 455/410 |

FOREIGN PATENT DOCUMENTS

| | | |
|---|---|---|
| CN | 102143509 A | 8/2011 |
| JP | 2009124250 A | 6/2009 |
| KR | 20090030629 A | 3/2009 |

OTHER PUBLICATIONS

Communication from a foreign counterpart application, International Application No. PCT/CN2011/083937, Partial English Translation, International Search Report dated Mar. 22, 2012, 2 pages.
Foreign Communication From A Counterpart Application, European Application No. 11848019.3, Extended European Search Report dated May 9, 2014, 7 pages.
Foreign Communication From A Counterpart Application, Chinese Application 201010592603.7, Office Action dated Dec. 31, 2012, 6 pages.
Foreign Communication From A Counterpart Application, Chinese Application 201010592603.7, Partial English Translation of Chinese Office Action dated Dec. 31, 2012, 5 pages.

* cited by examiner

METHOD, APPARATUS AND SYSTEM FOR AP TO MANAGE WIRELESS REPEATER

CROSS-REFERENCE TO RELATED APPLICATIONS

This application is a continuation of International Application No. PCT/CN2011/083937, filed on Dec. 14, 2011, which claims priority to Chinese Patent Application No. 201010592603.7, filed on Dec. 16, 2010, both of which are hereby incorporated by reference in their entireties.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present invention relates to the field of communications technologies, and in particular, to a method, an apparatus and a system for an access point (AP) to manage a wireless repeater.

BACKGROUND

A repeater (RP) may be used for work of bidirectional forwarding of signals between two network nodes. By replicating, adjusting, amplifying, resending or forwarding a data signal, a transmission distance of a network signal is extended.

With the development of a home broadband service, a wireless access terminal (e.g., a home gateway and an AP) has become an indispensable part of a home network. However, due to presence of factors such as room layout or wall thickness, a coverage area of a wireless signal is small.

Currently, a coverage area of a wireless signal of a home wireless network may be enlarged through wireless repeater technology, thereby solving a problem that the coverage area of the wireless signal is small.

In an existing home wireless network, for a wireless network formed of an AP and a repeater device connected to the AP, the following method is adopted to manage the repeater. A different internet protocol (IP) address is manually configured for each repeater device, a management console records correspondence between each repeater device and an IP address, and a user manages each repeater through the management console.

In the foregoing method, a configuration manner between the repeater device and the IP address is complicated, so operability is poor.

SUMMARY

Embodiments of the present invention provide a method, an apparatus and a system for an AP to manage a wireless repeater, which can implement searching for and managing, through a domain name, a repeater controlled by an AP, so as to improve operability.

In order to achieve the foregoing objective, the embodiments of the present invention adopt the following technical solutions.

A method for an AP to manage a wireless repeater includes: receiving an IP address request message that includes a domain name of a repeater to be managed and that is sent by a management console; parsing the IP address request message to obtain the domain name of the repeater to be managed; obtaining, from a domain name management list, an IP address which is of the repeater and corresponds to the domain name of the repeater to be managed, where correspondence between an IP address of a repeater and domain name information of the repeater is recorded in the domain name management list; and sending, to the management console, the IP address which is of the repeater and corresponds to the domain name of the repeater to be managed.

An apparatus for an AP to manage a wireless repeater includes: a receiving unit configured to receive an IP address request message that includes a domain name of a repeater to be managed and that is sent by a management console; a parsing unit configured to parse the IP address request message to obtain the domain name of the repeater to be managed; an obtaining unit configured to obtain, from a domain name management list, an IP address which is of the repeater and corresponds to the domain name of the repeater to be managed, where correspondence between an IP address of a repeater and domain name information of the repeater is recorded in the domain name management list; and a sending unit configured to send, to the management console, the IP address which is of the repeater and corresponds to the domain name of the repeater to be managed.

A system for an AP to manage a wireless repeater includes: a repeater configured to send, to an AP, a report message including an IP address and domain name information of the repeater; the AP configured to identify the IP address and the domain name information from the report message, record correspondence between the IP address and the domain name information in a domain name management list, parse an IP address request message sent by a management console to obtain a domain name of a repeater to be managed, obtain, from the domain name management list, an IP address which is of the repeater and corresponds to the domain name of the repeater to be managed, and send, to the management console, the IP address which is of the repeater and corresponds to the domain name of the repeater to be managed; and the management console configured to send, to the AP, the IP address request message including the domain name of the repeater to be managed.

In the method, apparatus and system for an AP to manage a wireless repeater provided by the embodiments of the present invention, because the AP records correspondence between an IP address and domain name information of the repeater controlled by the AP, there is no need to manually configure a different IP address for each repeater device, and the repeater is managed in a manner of a domain name, which improves the operability.

BRIEF DESCRIPTION OF THE DRAWINGS

To illustrate the technical solutions in the embodiments of the present invention more clearly, accompanying drawings required for describing the embodiments are briefly introduced in the following. Apparently, the accompanying drawings in the following description are merely some embodiments of the present invention, and persons of ordinary skill in the art may further obtain other drawings according to these accompanying drawings without creative efforts.

DETAILED DESCRIPTION

The technical solutions in the embodiments of the present invention are described clearly and completely in the following with reference to the accompanying drawings in the embodiments of the present invention. Apparently, the embodiments to be described are merely part of rather than all of the embodiments of the present invention. All other embodiments obtained by persons of ordinary skill in the art based on the embodiments of the present invention without creative efforts shall fall within the protection scope of the present invention.

Figure 1:
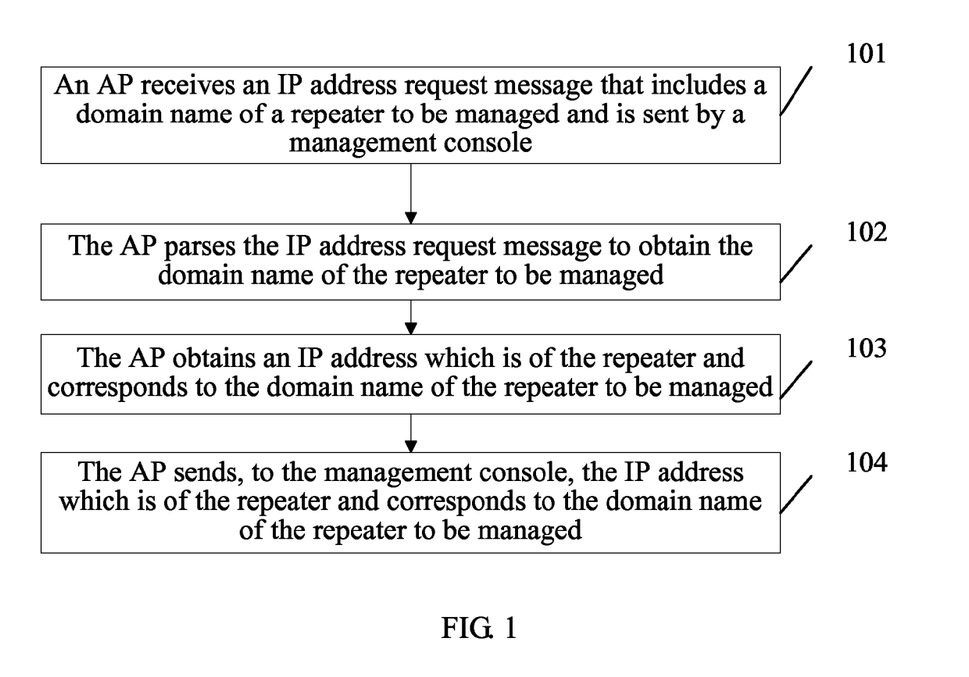
FIG. 1 is a flow chart of a method for an AP to manage a wireless repeater according to an embodiment of the present invention.

An embodiment of the present invention provides a method for an AP to manage a wireless repeater. As shown in FIG. 1, the method includes the following steps.

101: An AP receives an IP address request message that includes a domain name of a repeater to be managed and is sent by a management console.

When a management operation needs to be performed on a repeater, for example, when operations, such as configuration modification, configuration file upgrade and software version upgrade, need to be performed on a corresponding repeater, a user may send, to the AP and through the management console, an IP address request message of the repeater to be managed. The IP address request message includes domain name information of the repeater to be managed.

After the management console sends the IP address request message, the AP receives the IP address request message.

102: The AP parses the IP address request message to obtain the domain name of the repeater to be managed.

In order to implement searching, according to the domain name of the repeater to be managed, for an IP address of the repeater to be managed in a subsequent step, the domain name of the repeater to be managed needs to be first obtained through parsing.

103: The AP obtains, from a domain name management list, the IP address which is of the repeater and corresponds to the domain name of the repeater to be managed, where correspondence between an IP address of a repeater and domain name information of the repeater is recorded in the domain name management list.

The AP obtains, according to the domain name of the repeater to be managed, the corresponding IP address of the repeater from the domain name management list in which the correspondence between the IP address of the repeater and corresponding domain name information of the repeater is recorded.

104: The AP sends, to the management console, the IP address which is of the repeater and corresponds to the domain name of the repeater to be managed.

The AP sends the obtained IP address of the repeater to the management console, so that the management console searches for a corresponding repeater, manages the repeater, and performs a corresponding management operation.

In the method for an AP to manage a wireless repeater provided by this embodiment, because the AP records correspondence between an IP address and domain name information of a repeater controlled by the AP, when a user intends to search, through a domain name, for a corresponding repeater, the AP can find, from the recorded correspondence between the IP address and the domain name information of the repeater, an IP address which is of the repeater and corresponds to the domain name, and transfer the IP address of the repeater to a management console of the user, and the management console of the user further searches, according to the IP address of the repeater, for the corresponding repeater, and performs a management operation on the repeater.

It is implemented that the user uses a domain name to search, through the management console, for a corresponding repeater and performs a management operation on the repeater. Compared with the prior art, because the AP records the correspondence between the IP address and the domain name information of the repeater controlled by the AP, there is no need to manually configure a different IP address for each repeater device, and the repeater is managed in a manner of a domain name, which improves operability.

Figure 2:
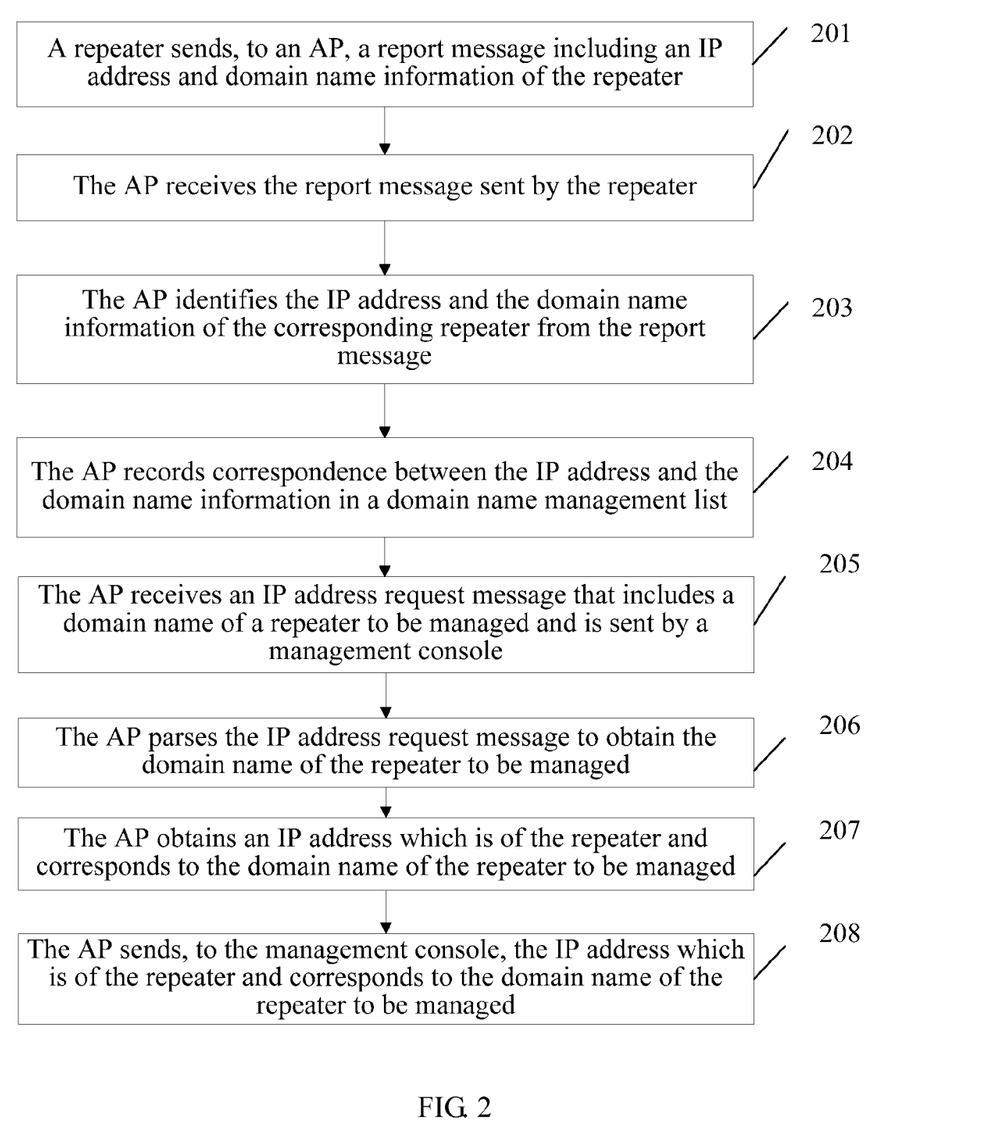
FIG. 2 is a flow chart of an improved method for an AP to manage a wireless repeater according to an embodiment of the present invention.

As an improvement of this embodiment, an embodiment of the present invention provides another method for an AP to manage a wireless repeater. As shown in FIG. 2, the method includes the following steps.

201: A repeater sends, to an AP, a report message including an IP address and domain name information of the repeater.

After a repeater device is successfully connected to an AP through a wireless technology, a reporting module of the repeater reports an IP address and domain name information of the repeater to the AP by sending a report message to the AP. The report message includes the IP address and the domain name information of the repeater.

In this embodiment, the IP address of the repeater may include the following three implementation manners.

1. The IP address of the repeater may be a statically set IP address of a corresponding repeater, for example, 192.168.1.100. In this situation, a format and a protocol of the report message sent by the repeater to the AP may be customized, for example, the report message may be sent over a hypertext transfer protocol (HTTP), a transmission control protocol (TCP), or a user datagram protocol (UDP).

2. The IP address of the repeater is an IP address generated by the repeater according to an IP address segment of the AP connected to the repeater, for example, 192.168.2.100. In this situation, a format and a protocol of the report message sent by the repeater to the AP may be customized, for example, the report message may be sent over an HTTP, a TCP, or a UDP protocol.

3. The IP address of the repeater is an IP address assigned by the AP connected to the repeater.

Specifically, the repeater needs to support a dynamic host configuration protocol (DHCP) client (e.g., a protocol which runs on a client and has a function of obtaining an IP address from a DHCP) function, and the AP needs to support a DHCP server function.

After the repeater successfully connects to the AP, the repeater applies, through a DHCP client, to the AP for an IP address. In a process of applying for the IP address, the repeater reports, through an option of the DHCP, the domain name information of the repeater to the AP at the same time.

Formats of the option and reported information may be customized, for example, the domain name of the repeater reported through option60 is Reapeater1.

In this embodiment, the domain name information of the repeater may be set by a manufacturer of the repeater during production.

202: The AP receives the report message that includes the IP address and the domain name information of the repeater and is sent by the repeater.

After the repeater device sends the report message, the AP receives the report message that includes the IP address and the domain name information of the repeater and is sent by the repeater.

203: The AP identifies the IP address and the domain name information from the report message.

After receiving the report message, the AP identifies the IP address and the domain name information of the corresponding repeater from the report message.

204: The AP records correspondence between the IP address and the domain name information in a domain name management list.

In order to enable the user to search, through a domain name, for a corresponding repeater and to manage the repeater, the AP needs to record correspondence between an IP address and domain name information of a repeater, and store the correspondence between the IP address and the domain name information of the repeater in the domain name management list.

When the user intends to search, through a domain name, for a corresponding repeater, the AP first finds an IP address which is of the repeater and corresponds to the domain name, and the AP transfers the IP address of the repeater to a management console of the user, and the management console of the user can search, according to the IP address of the repeater, for the corresponding repeater and manage the repeater.

205: The AP receives an IP address request message that includes a domain name of a repeater to be managed and is sent by a management console.

When a management operation needs to be performed on a repeater, for example, when operations, such as configuration modification, configuration file upgrade and software version upgrade, need to be performed on a corresponding repeater, the user may send, to the AP and through the management console, an IP address request message of the repeater to be managed. The IP address request message includes domain name information of the repeater to be managed.

After the management console sends the IP address request message, the AP receives the IP address request message.

206: The AP parses the IP address request message to obtain the domain name of the repeater to be managed.

In order to implement searching, according to the domain name of the repeater to be managed, for an IP address of the repeater to be managed in a subsequent step, the domain name of the repeater to be managed needs to be first obtained through parsing.

207: The AP obtains, from the domain name management list, the IP address which is of the repeater and corresponds to the domain name of the repeater to be managed, where correspondence between an IP address of a repeater and domain name information of the repeater is recorded in the domain name management list.

The AP obtains, according to the domain name of the repeater to be managed, the corresponding IP address of the repeater from the domain name management list in which the correspondence between the IP address of the repeater and corresponding domain name information of the repeater is recorded.

208: The AP sends, to the management console, the IP address which is of the repeater and corresponds to the domain name of the repeater to be managed.

The AP sends the obtained IP address of the repeater to the management console, so that the management console searches for a corresponding repeater, manages the repeater, and performs a corresponding management operation.

In the method for an AP to manage a wireless repeater provided by this embodiment, because the AP records correspondence between an IP address and domain name information of a repeater controlled by the AP, when a user intends to search, through a domain name, for a corresponding repeater, the AP can find, from the recorded correspondence between the IP address and the domain name information of the repeater, an IP address which is of the repeater and corresponds to the domain name, and transfer the IP address of the repeater to a management console of the user, and the management console of the user further searches, according to the IP address of the repeater, for the corresponding repeater, and performs a management operation on the repeater.

It is implemented that the user uses a domain name to search, through the management console, for a corresponding repeater and performs a management operation on the repeater. Compared with the prior art, because the AP records the correspondence between the IP address and the domain name information of the repeater controlled by the AP, there is no need to manually configure a different IP address for each repeater device, and the repeater is managed in a manner of a domain name, which improves operability.

As an implementation manner of this embodiment, the IP address request message may be a domain name service (DNS) request packet, and a DNS server is disposed at an AP end.

Figure 3:
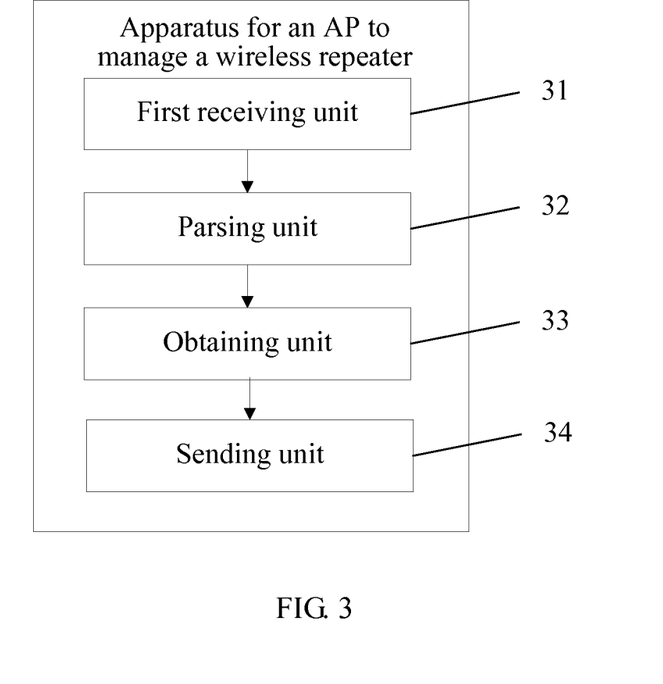
FIG. 3 is a structural diagram of an apparatus for an AP to manage a wireless repeater according to an embodiment of the present invention.

An embodiment of the present invention provides another apparatus for an AP to manage a wireless repeater. As shown in FIG. 3, the apparatus includes: a first receiving unit 31, a parsing unit 32, an obtaining unit 33 and a sending unit 34.

The first receiving unit 31 is configured to receive an IP address request message that includes a domain name of a repeater to be managed and is sent by a management console. The parsing unit 32 is configured to parse the IP address request message to obtain the domain name of the repeater to be managed. The obtaining unit 33 is configured to obtain, from a domain name management list, an IP address which is of the repeater and corresponds to the domain name of the repeater to be managed, where correspondence between an IP address of a repeater and domain name information of the repeater is recorded in the domain name management list. The sending unit 34 is configured to send, to the management console, the IP address which is of the repeater and corresponds to the domain name of the repeater to be managed.

In the apparatus for an AP to manage a wireless repeater provided by this embodiment, because the AP records correspondence between an IP address and domain name information of a repeater controlled by the AP, when a user intends to search, through a domain name, for a corresponding repeater, the AP can find, from the recorded correspondence between the IP address and the domain name information of the repeater, an IP address which is of the repeater and corresponds to the domain name, and transfer the IP address of the repeater to a management console of the user, and the management console of the user further searches, according to the IP address of the repeater, for the corresponding repeater, and performs a management operation on the repeater.

It is implemented that the user uses a domain name to search, through the management console, for a corresponding repeater and performs a management operation on the repeater.

Figure 4:
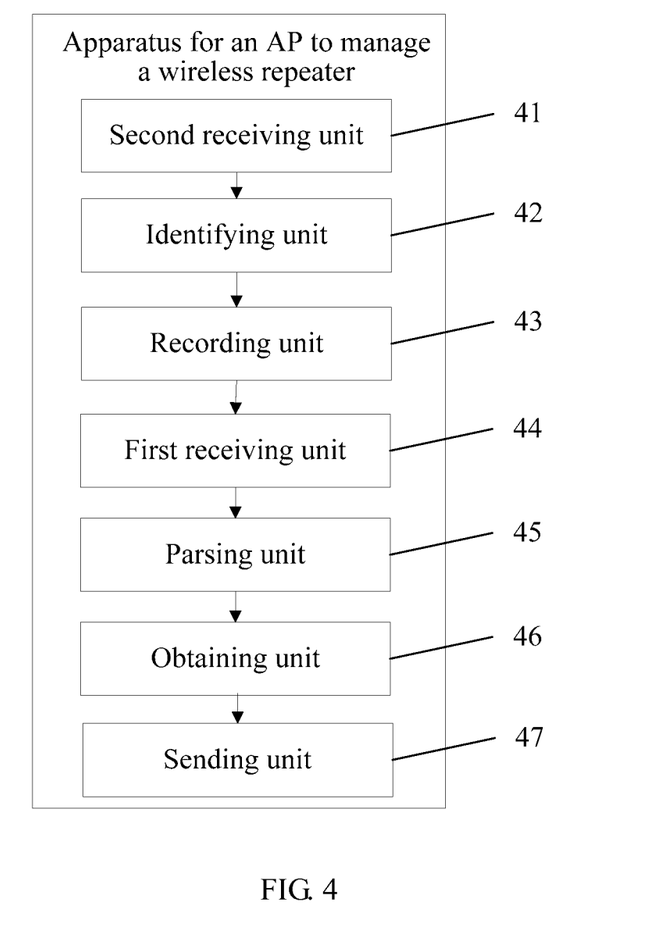
FIG. 4 is a structural diagram of an improved apparatus for an AP to manage a wireless repeater according to an embodiment of the present invention.

As an improvement of this embodiment, an embodiment of the present invention provides another apparatus for an AP to manage a wireless repeater. As shown in FIG. 4, the apparatus includes: a second receiving unit 41, an identifying unit 42, a recording unit 43, a first receiving unit 44, a parsing unit 45, an obtaining unit 46 and a sending unit 47.

The second receiving unit 41 is configured to receive a report message that includes an IP address and domain name information of a repeater and is sent by the repeater. The identifying unit 42 is configured to identify the IP address and the domain name information from the report message. The recording unit 43 is configured to record correspondence between the IP address and the domain name information in a domain name management list.

The first receiving unit 44 is configured to receive an IP address request message that includes a domain name of a repeater to be managed and is sent by a management console. The parsing unit 45 is configured to parse the IP address request message to obtain the domain name of the repeater to be managed. The obtaining unit 46 is configured to obtain, from the domain name management list, an IP address which is of the repeater and corresponds to the domain name of the repeater to be managed, where correspondence between an IP address of a repeater and domain name information of the repeater is recorded in the domain name management list. The sending unit 47 is configured to send, to the management console, the IP address which is of the repeater and corresponds to the domain name of the repeater to be managed.

In the apparatus for an AP to manage a wireless repeater provided by this embodiment, because the AP records correspondence between an IP address and domain name information of a repeater controlled by the AP, when a user intends to search, through a domain name, for a corresponding repeater, the AP can find, from the recorded correspondence between the IP address and the domain name information of the repeater, an IP address which is of the repeater and corresponds to the domain name, and transfer the IP address of the repeater to a management console of the user, and the management console of the user further searches, according to the IP address of the repeater, for the corresponding repeater, and performs a management operation on the repeater.

It is implemented that the user uses a domain name to search, through the management console, for a corresponding repeater and performs a management operation on the repeater. Compared with the prior art, because the AP records the correspondence between the IP address and the domain name information of the repeater controlled by the AP, there is no need to manually configure a different IP address for each repeater device, and the repeater is managed in a manner of a domain name, which improves operability.

As an implementation manner of this embodiment, in this embodiment, the IP address of the repeater may include the following three implementation manners.

1. The IP address of the repeater may be a statically set IP address of the corresponding repeater, for example, 192.168.1.100.

2. The IP address of the repeater is an IP address generated by the repeater according to an IP address segment of the AP connected to the repeater, for example, 192.168.2.100.

3. The IP address of the repeater is an IP address assigned by the AP connected to the repeater.

Specifically, the repeater needs to support a DHCP client (e.g., a protocol which runs on a client and has a function of obtaining an IP address from a DHCP) function, and the AP needs to support a DHCP server function.

After the repeater successfully connects to the AP, the repeater applies, through a DHCP client, to the AP for an IP address. In a process of applying for the IP address, the repeater reports, through an Option option of the DHCP, the domain name information of the repeater to the AP at the same time.

Formats of the option and reported information may be customized, for example, the domain name of the repeater reported through option60 is Reapeater1.

Figure 5:
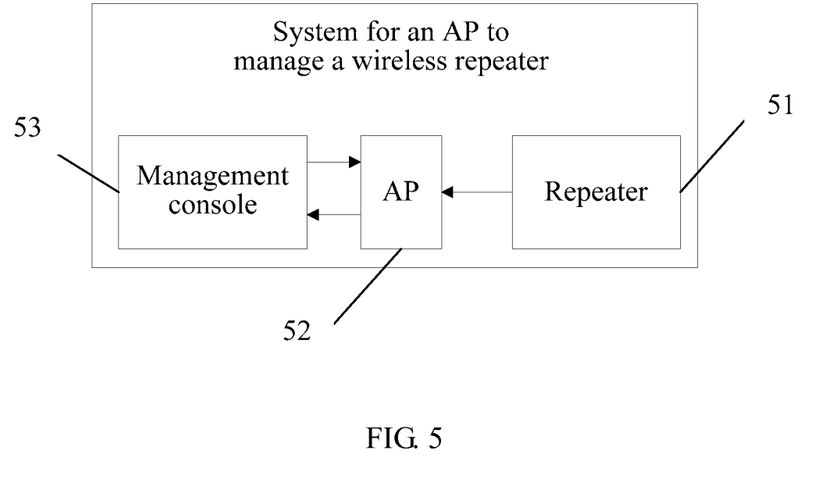
FIG. 5 is a structural diagram of a system for an AP to manage a wireless repeater according to an embodiment of the present invention.

An embodiment of the present invention provides a system for an AP to manage a wireless repeater. As shown in FIG. 5, the system includes: a repeater 51, an AP 52 and a management console 53.

The repeater 51 is configured to send, to an AP, a report message including an IP address and domain name information of the repeater.

The AP 52 is configured to identify the IP address and the domain name information from the report message, and record correspondence between the IP address and the domain name information in a domain name management list.

The management console 53 is configured to send, to the AP, an IP address request message including a domain name of a repeater to be managed.

The AP 52 parses the IP address request message sent by the management console to obtain the domain name of the repeater to be managed; obtains, from the domain name management list, an IP address which is of the repeater and corresponds to the domain name of the repeater to be managed, where correspondence between an IP address of a repeater and domain name information of the repeater is recorded in the domain name management list; and sends, to the management console, the IP address which is of the repeater and corresponds to the domain name of the repeater to be managed.

In the system for an AP to manage a wireless repeater provided by this embodiment, because the AP records correspondence between an IP address and domain name information of a repeater controlled by the AP, when a user intends to search, through a domain name, for a corresponding repeater, the AP can find, from the recorded correspondence between the IP address and the domain name information of the repeater, an IP address which is of the repeater and corresponds to the domain name, and transfer the IP address of the repeater to a management console of the user, and the management console of the user further searches, according to the IP address of the repeater, for the corresponding repeater, and performs a management operation on the repeater.

It is implemented that the user uses a domain name to search, through the management console, for a corresponding repeater and performs a management operation on the repeater. Compared with the prior art, because the AP records the correspondence between the IP address and the domain name information of the repeater controlled by the AP, there is no need to manually configure a different IP address for each repeater device, and the repeater is managed in a manner of a domain name, which improves operability.

As an implementation manner of this embodiment, in this embodiment, the management console 53 may be connected to the repeater 51, and may also be connected to the AP 52.

As an implementation manner of this embodiment, an IP address of the management console, an IP address of the AP, and the IP address of the repeater may be made IP addresses of a same network segment in the following two manners.

1. The IP address of the management console 53 may be obtained by the management console 53 from the AP 52 in a DHCP client manner, and an IP address of a domain name system (DNS) is the IP address of the AP 52.

2. The IP address of the management console 53 and the IP address of the AP are statically configured to IP addresses of a same network segment, and an IP address of a DNS is the IP address of the AP 52.

Sequence numbers of the foregoing embodiments of the present invention are merely for description purpose, but do not indicate the preference of the embodiments.

Persons skilled in the art may understand clearly that the embodiments of the present invention may be implemented in a manner of software and a necessary universal hardware platform. Based on such understanding, the essence of the technical solutions in the embodiments of the present invention or the part that makes contributions to the prior art may be substantially embodied in a form of a software product. The computer software product may be stored in a storage medium such as a read-only memory (ROM), a random-access memory (RAM), a magnetic disk or an optical disk, and include several instructions to enable a computer device (e.g., a personal computer, a server or a network device, and so on) to perform the methods described in the embodiments of the present invention or in some parts of the embodiments of the present invention.

The foregoing specific embodiments are not intended to limit the present invention. For persons of ordinary skill in the art, any modification, equivalent replacement and improvement made without departing from the principle of the present invention shall fall within the protection scope of the present invention.

What is claimed is:

1. A method for an access point (AP) to manage a wireless repeater comprising:
   receiving an internet protocol (IP) address request message that comprises a domain name of a repeater to be managed and that is sent by a management console;
   parsing the IP address request message to obtain the domain name of the repeater to be managed;
   obtaining, from a domain name management list, an IP address of the repeater that corresponds to the domain name of the repeater to be managed, wherein correspondence between the IP address of the repeater and domain name information of the repeater is recorded in the domain name management list; and
   sending, to the management console, the IP address of the repeater that corresponds to the domain name of the repeater to be managed,
   wherein before obtaining the IP address of the repeater, the method further comprises:
      receiving a report message that comprises the IP address and the domain name information of the repeater and that is sent by the repeater;
      identifying the IP address and the domain name information from the report message; and
      recording the correspondence between the IP address and the domain name information in the domain name management list.

2. The method according to claim 1, wherein the IP address is a static IP address of the repeater.

3. The method according to claim 1, wherein the IP address is an IP address generated by the repeater according to an IP address segment of the AP connected to the repeater.

4. The method according to claim 1, wherein the IP address is an IP address assigned by the AP connected to the repeater, and wherein the repeater sends the domain name information through an option of a dynamic host configuration protocol (DHCP).

5. The method according to claim 1, wherein the IP address request message is a domain name system (DNS) request packet.

6. An apparatus for an access point (AP) to manage a wireless repeater comprising:
   a first receiving unit configured to receive an Internet Protocol (IP) address request message that comprises a domain name of a repeater to be managed and is sent by a management console;
   a parsing unit configured to parse the IP address request message to obtain the domain name of the repeater to be managed;
   an obtaining unit configured to obtain, from a domain name management list, an IP address of the repeater that corresponds to the domain name of the repeater to be managed, wherein correspondence between the IP address of the repeater and domain name information of the repeater is recorded in the domain name management list;
   a sending unit configured to send, to the management console, the IP address of the repeater that corresponds to the domain name of the repeater to be managed;
   a second receiving unit configured to receive a report message that comprises the IP address and the domain name information of the repeater and that is sent by the repeater;
   an identifying unit configured to identify the IP address and the domain name information from the report message; and
   a recording unit configured to record the correspondence between the IP address and the domain name information in the domain name management list.

7. The apparatus according to claim 6, wherein the IP address is a static IP address of the repeater.

8. The apparatus according to claim 6, wherein the IP address is an IP address generated by the repeater according to an IP address segment of the AP.

9. The apparatus according to claim 6, wherein the IP address is an IP address assigned by the AP, and wherein the repeater sends the domain name information through an option of a dynamic host configuration protocol (DHCP).

10. A system to manage a wireless repeater comprising:
    a repeater;
    an access point (AP); and
    a management console,
    wherein the repeater is configured to send, to the AP, a report message comprising an Internet Protocol (IP) address and domain name information of the repeater,
    wherein the AP is configured to identify the IP address and the domain name information from the report message,
    wherein the AP is configured to record correspondence between the IP address and the domain name information in a domain name management list,
    wherein the AP is configured to parse an IP address request message sent by the management console to obtain a domain name of the repeater to be managed,
    wherein the AP is configured to obtain, from the domain name management list, the IP address of the repeater that corresponds to the domain name of the repeater to be managed,
    wherein the AP is configured to send, to the management console, the IP address of the repeater that corresponds to the domain name of the repeater to be managed, and wherein the management console is configured to send, to the AP, the IP address request message comprising the domain name of the repeater to be managed.

11. The system according to claim 10, wherein the management console is connected to the repeater or the AP.

12. The system according to claim 10, wherein the IP address of the management console is obtained by the management console from the AP in a dynamic host configuration protocol (DHCP) client manner, and an IP address of a domain name system (DNS) is an IP address of the AP, or wherein an IP address of the management console and an IP address of the AP are statically configured to IP addresses of a same network segment, and an IP address of a DNS is the IP address of the AP.

* * * * *